US 11,417,135 B2

United States Patent
Suzuki et al.

(10) Patent No.: US 11,417,135 B2
(45) Date of Patent: Aug. 16, 2022

(54) INFORMATION PROCESSING APPARATUS, INFORMATION PROCESSING METHOD, AND PROGRAM

(71) Applicant: SONY CORPORATION, Tokyo (JP)

(72) Inventors: Ryuichi Suzuki, Tokyo (JP); Kentaro Ida, Tokyo (JP); Takuya Ikeda, Tokyo (JP); Fumihiko Iida, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/639,358

(22) PCT Filed: Jul. 11, 2018

(86) PCT No.: PCT/JP2018/026110
§ 371 (c)(1),
(2) Date: Feb. 14, 2020

(87) PCT Pub. No.: WO2019/039119
PCT Pub. Date: Feb. 28, 2019

(65) Prior Publication Data
US 2020/0250412 A1    Aug. 6, 2020

(30) Foreign Application Priority Data
Aug. 23, 2017    (JP) .............................. JP2017-160080

(51) Int. Cl.
| | | |
|---|---|---|
| *G06V 40/10* | (2022.01) | |
| *G06F 3/01* | (2006.01) | |
| *H04N 21/442* | (2011.01) | |
| *G06V 40/20* | (2022.01) | |

(52) U.S. Cl.
CPC ............ *G06V 40/103* (2022.01); *G06F 3/013* (2013.01); *G06V 40/28* (2022.01); *H04N 21/44218* (2013.01)

(58) Field of Classification Search
None
See application file for complete search history.

(56) References Cited

U.S. PATENT DOCUMENTS

| | | | | |
|---|---|---|---|---|
| 5,597,223 | A | * | 1/1997 | Watanabe .......... G02B 26/0833 |
| | | | | 349/61 |
| 8,089,423 | B1 | | 1/2012 | Harris |
| 9,710,772 | B1 | * | 7/2017 | Kelly ................... G06Q 10/083 |
| 9,723,293 | B1 | | 8/2017 | Cederlof |

(Continued)

FOREIGN PATENT DOCUMENTS

| | | | | |
|---|---|---|---|---|
| AU | 2014202369 | A1 | * 5/2014 | ..... H04N 21/234327 |
| CN | 1985497 | A | 6/2007 | |

(Continued)

*Primary Examiner* — Michelle M Entezari
(74) *Attorney, Agent, or Firm* — Paratus Law Group, PLLC

(57) ABSTRACT

There is provided an information processing apparatus, an information processing method, and a program that can optimize information output in response to an environment in a space, the information processing apparatus including: a recognition unit that recognizes a situation in a space based on sensor data obtained by sensing the space in which a content is output; and a determination unit that determines an output scheme of the content based on a result of the recognition and an analysis result of related information of the content.

19 Claims, 18 Drawing Sheets

DETECT PLANE

PROJECTION-INAPPROPRIATE AREA

(56) References Cited

U.S. PATENT DOCUMENTS

| | | | |
|---|---|---|---|
| 10,904,615 B2* | 1/2021 | Boss | H04N 21/44218 |
| 2003/0011711 A1* | 1/2003 | Shyu | H04N 21/440218 |
| | | | 348/588 |
| 2003/0123092 A1* | 7/2003 | Toda | H04N 1/41 |
| | | | 358/2.1 |
| 2003/0231259 A1* | 12/2003 | Yui | H04N 21/4316 |
| | | | 348/564 |
| 2004/0130568 A1* | 7/2004 | Nagano | H04N 21/64792 |
| | | | 715/733 |
| 2006/0139353 A1* | 6/2006 | Washio | G06T 11/203 |
| | | | 345/467 |
| 2007/0092273 A1* | 4/2007 | Shiroki | G03G 15/553 |
| | | | 399/27 |
| 2007/0100653 A1* | 5/2007 | Ramer | G06F 16/68 |
| | | | 705/1.1 |
| 2008/0218853 A1* | 9/2008 | El-Ghoroury | G03B 21/625 |
| | | | 359/449 |
| 2009/0310102 A1* | 12/2009 | Jung | H04N 9/3194 |
| | | | 353/122 |
| 2011/0258049 A1* | 10/2011 | Ramer | G06Q 30/0273 |
| | | | 705/14.66 |
| 2013/0027608 A1* | 1/2013 | Belisomi | H04N 7/0122 |
| | | | 348/441 |
| 2013/0304587 A1* | 11/2013 | Ralston | G06Q 30/0275 |
| | | | 705/14.67 |
| 2014/0013228 A1* | 1/2014 | Hutten | G06F 3/048 |
| | | | 715/720 |
| 2014/0055479 A1* | 2/2014 | Kawanishi | G06T 5/00 |
| | | | 345/581 |
| 2014/0118631 A1 | 5/2014 | Cho | |
| 2015/0113411 A1* | 4/2015 | Underwood | G06F 3/0484 |
| | | | 715/730 |
| 2015/0116362 A1 | 4/2015 | Aurongzeb et al. | |
| 2015/0116364 A1 | 4/2015 | Aurongzeb et al. | |
| 2015/0149585 A1* | 5/2015 | Zhang | G06Q 10/10 |
| | | | 709/217 |
| 2015/0205451 A1* | 7/2015 | Lee | G06F 3/0486 |
| | | | 715/766 |
| 2015/0244665 A1* | 8/2015 | Choi | H04L 51/24 |
| | | | 709/206 |
| 2015/0264299 A1* | 9/2015 | Leech | H04N 19/17 |
| | | | 348/78 |
| 2016/0111039 A1* | 4/2016 | Iwami | H04N 21/43637 |
| | | | 345/520 |
| 2016/0182613 A1 | 6/2016 | Brune et al. | |
| 2016/0353118 A1* | 12/2016 | Zhang | H04N 19/85 |
| 2017/0031530 A1* | 2/2017 | Ikeda | G06F 3/0483 |
| 2017/0221238 A1* | 8/2017 | Limberger | G06T 15/005 |
| 2017/0289596 A1* | 10/2017 | Krasadakis | H04W 4/029 |
| 2017/0318234 A1* | 11/2017 | Maeda | G09G 5/18 |
| 2017/0330495 A1* | 11/2017 | Doi | H04N 5/74 |
| 2018/0095528 A1* | 4/2018 | Tao | G06F 9/00369 |
| 2018/0373568 A1* | 12/2018 | Frost | G06F 9/5083 |
| 2019/0087662 A1* | 3/2019 | Zhao | H04N 5/247 |
| 2020/0250412 A1* | 8/2020 | Suzuki | G06K 9/00369 |

FOREIGN PATENT DOCUMENTS

| | | |
|---|---|---|
| CN | 103312555 A | 9/2013 |
| EP | 1396781 A2 | 3/2004 |
| EP | 2827304 A1 | 1/2015 |
| JP | 2005-099064 A | 4/2005 |
| JP | 2005-313291 A | 11/2005 |
| JP | 2007-210460 A | 8/2007 |
| JP | 2009-223061 A | 10/2009 |
| JP | 2015-052980 A | 3/2015 |
| JP | 2015-145894 A | 8/2015 |
| JP | 2017-049474 A | 3/2017 |
| WO | WO 2016/075967 A1 | 5/2016 |
| WO | WO 2017/043145 A | 3/2017 |
| WO | WO 2017/122363 A1 | 7/2017 |

* cited by examiner

FIG.5

| ID | POSITION | | STATE | |
| --- | --- | --- | --- | --- |
| | COORDINATE P(x,y,z) | VIEW VECTOR V(x,y,z) | POSTURE | BEHAVIOR |
| 1 | p1(2000, 1500, 600) | v1(0.18, -0.91, 0.37) | SEATED | MIDDLE OF WATCHING CONTENT A |
| 2 | p2(2500, 4000, 1800) | v2(-0.44, -0.87, 0.22) | STANDING | MIDDLE OF MOVING |

FIG.6
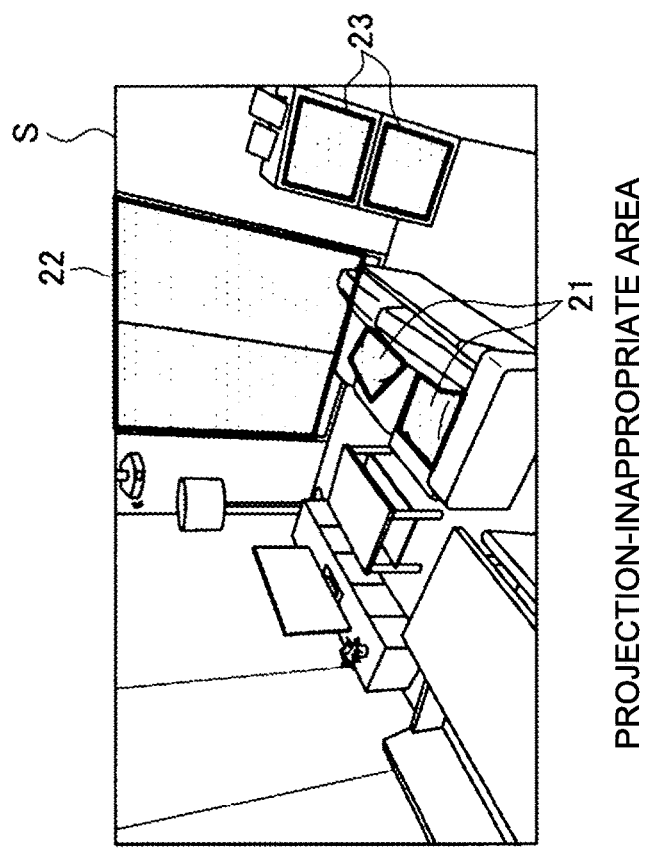
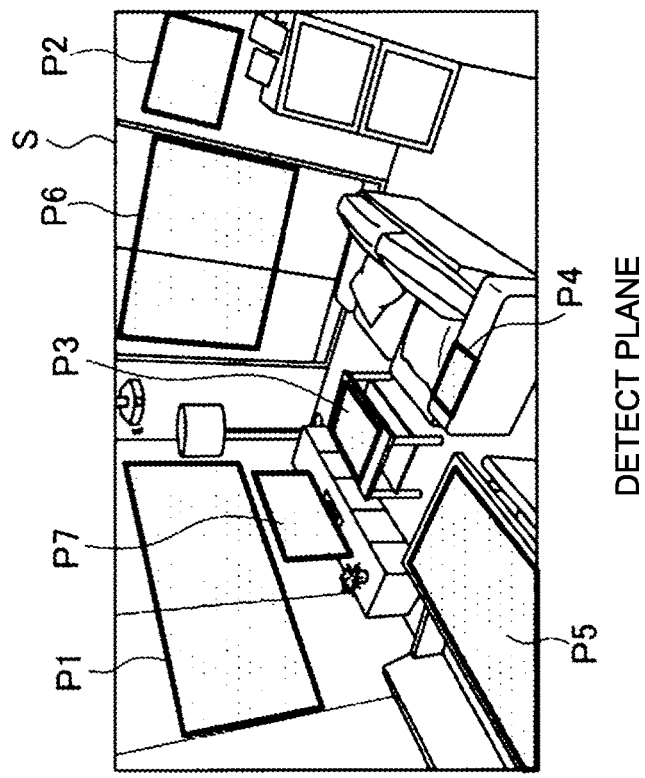

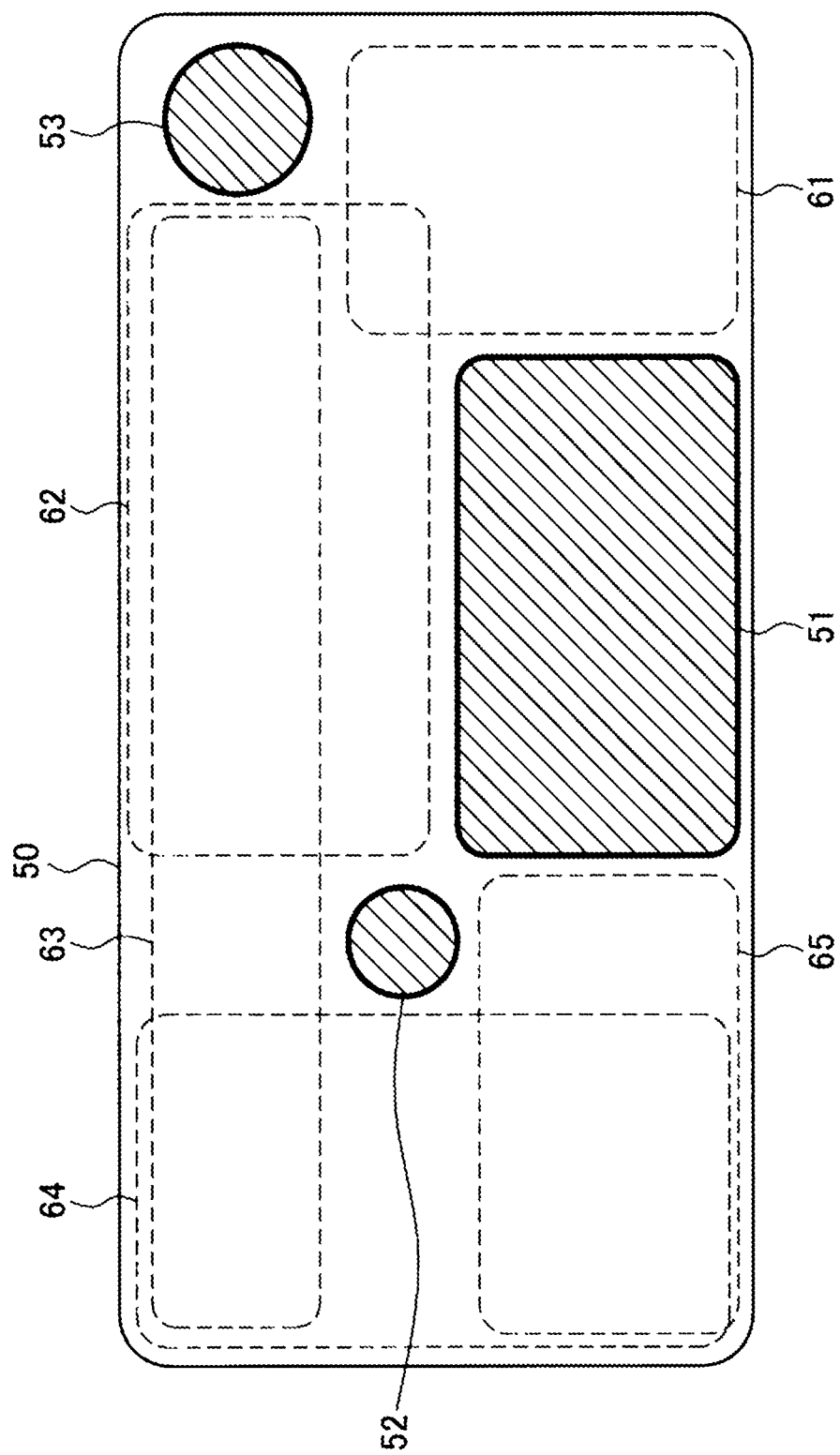

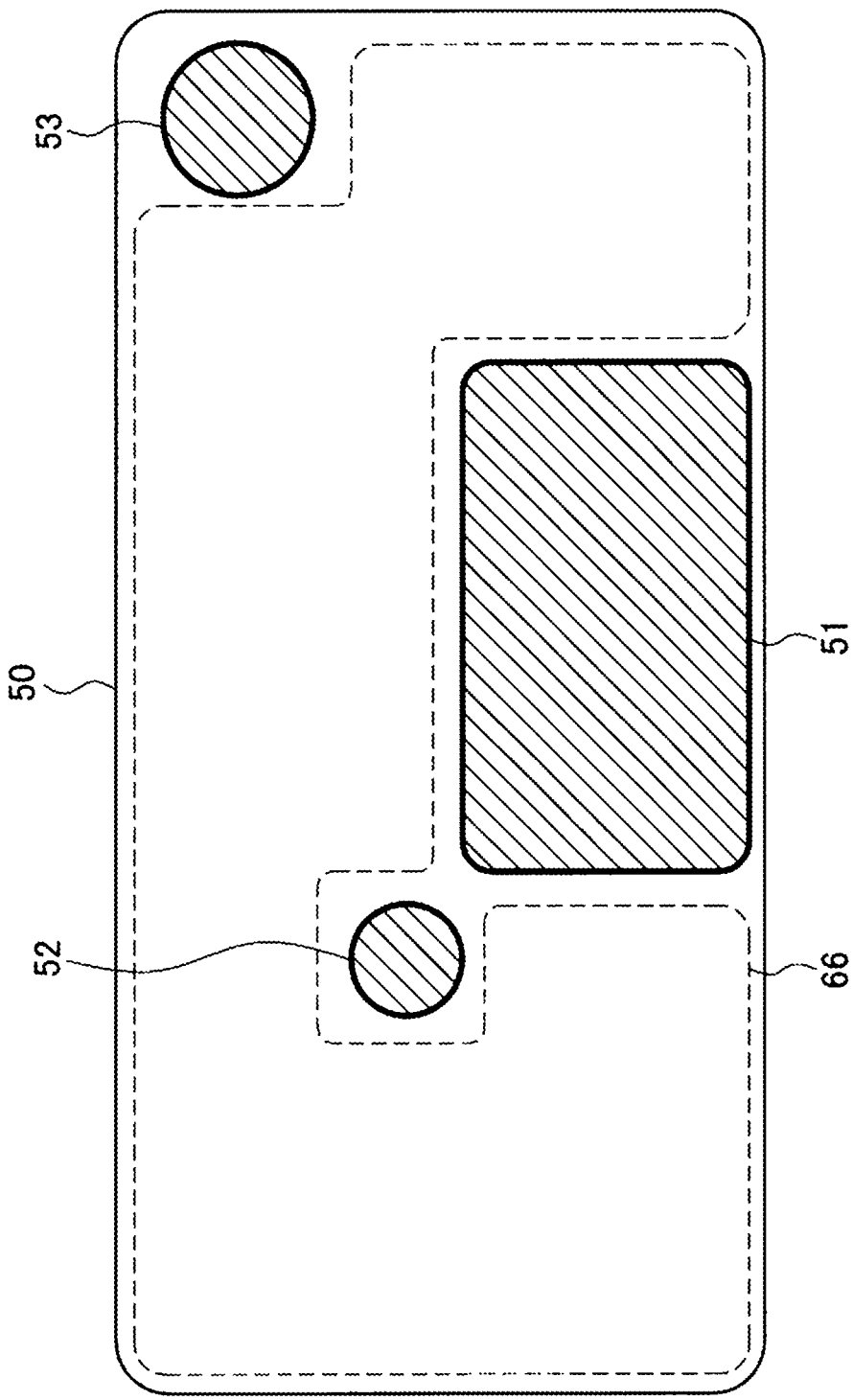

FIG.11

| ID | OUTPUT DEVICE | | | | | OUTPUT TYPE | | |
| --- | --- | --- | --- | --- | --- | --- | --- | --- |
| | NAME | FORM | OUTPUT-POSSIBLE POSITION | RESPONSIVENESS (msec) | STATE | DISPLAY | SOUND | VIBRATION |
| 1 | FIXED PROJECTOR_[a] | FIXED | 1 | 8500 | STANDBY | ○ | ○ | - |
| 2 | TV_[a] | FIXED | 1 | 15 | BEING STARTED | ○ | ○ | - |
| 3 | FIXED VIBRATOR_[a] | FIXED | 1 | 400 | STANDBY | - | - | ○ |
| 4 | DRIVEN PROJECTOR_[a] | DRIVEN | 3 | 200/90/550 | BEING USED | ○ | ○ | - |
| 5 | DRIVEN PROJECTOR_[b] | DRIVEN | 2 | 500/2100 | BEING STARTED | ○ | - | - |
| 6 | DRIVEN SPEAKER_[a] | DRIVEN | 3 | 40/35/35 | BEING STARTED | - | ○ | - |
| 7 | AR GLASS_[a] | WEARABLE | 1 | 400 | BEING USED (PERSON B) | ○ | ○ | ○ |
| 8 | SMARTPHONE_[a] | WEARABLE | 1 | 400 | BEING WORN (PERSON A) | ○ | ○ | ○ |
| 9 | BT SPEAKER_[A] | WEARABLE | 1 | 200 | NOT WORN | - | ○ | - |

FIG.12

| ID | NAME | TARGET | | REQUEST | | FORMAT | |
|---|---|---|---|---|---|---|---|
| | | TARGET PERSON | TARGET-EXEMPT PERSON | PRESENCE/ABSENCE OF JOB | IMPORTANCE | INFORMATION | COLOR INFORMATION |
| 1 | INTERPHONE | A, B | | NOTIFICATION | A,B: IMMEDIATE NOTIFICATION | STILL IMAGE | FULL COLOR |
| 2 | MESSAGE | B | A | NOTIFICATION | B: NOTIFICATION | CHARACTER | BLACK AND WHITE |
| 3 | Touch UI INPUT | A | | INPUT | A: ACTIVE | ICON | BLACK AND WHITE |

FIG.13

| LARGE CATEGORY | MEDIUM CATEGORY | CATEGORY | ELEMENT | PARAMETER EXAMPLE |
|---|---|---|---|---|
| | PERSON (A) | POSITION | WATCHING DISTANCE | ~1m, 1~3m, 3~5m, 5m~ |
| | | DIRECTION WITH RESPECT TO PROJECTION SURFACE | ANGLE DIFFERENCE (VERTICAL/HORIZONTAL) OF PROJECTION SURFACE | 0~15°, 15~45°, 45~60°, 60°~ |
| | | | ANGLE IN FIELD OF VIEW (VERTICAL/HORIZONTAL) OF PROJECTION SURFACE | 0~15°, 15~45°, 45~60°, 60°~ |
| | | BODY FEATURE | VISUAL ACUITY | ~0.3, 0.3~0.7, 0.7~1.5, 1.5~ |
| | | | HEIGHT | ~80, 80~140, 140~180, 180cm~ |
| | | | AGE | ~3, 3~18, 18~50, 50 YEARS AND OLDER~ |
| | PERSON (B) | SAME AS ABOVE | | |
| | PERSON (C) | SAME AS ABOVE | | |

FIG.14

| LARGE CATEGORY | MEDIUM CATEGORY | CATEGORY | ELEMENT | PARAMETER EXAMPLE |
|---|---|---|---|---|
| OUTPUT |  ENVIRONMENT | DISPLAY SURFACE SHAPE | SCREEN SIZE | ~10, 10~30, 30~60, 60inch~ |
| | | | ASPECT RATIO | ~1:2, 1:2~2:1, 2:1~ |
| | | DISPLAY SURFACE MATERIAL | ROUGHNESS OF PROJECTION SURFACE (Ra) | ~0.1mm, 0.1mm~1m, 1m~ |
| | | | REFLECTION OF PROJECTION SURFACE | |
| | | | COLOR OF PROJECTION SURFACE | SELF-LUMINOUS, WHITE, COLORED, BLACK/PROJECTION-IMPOSSIBLE |
| | | ENVIRONMENT ILLUMINANCE | ILLUMINANCE | ~10, 10~50, 50~100, 100lx~ |
| | | | COLOR TEMPERATURE | ~4000, 4000~8000, 8000k~ |
| |  DEVICE | BRIGHTNESS [PROJECTOR] | BRIGHTNESS | ~500, 500~4000, 4000lm~ |
| | | RESOLUTION | RESOLUTION | ~720p, 720p~1080p, 1080p~ |
| | | DEVICE [PROJECTOR] | FOCUS PROJECTION DEPTH DIFFERENCE (DISTANCE RATIO) | |
| | | DEVICE [AR GLASS] | STEREOSCOPIC VIEW POSSIBLE DISTANCE | 3~10m |
| | [SOUND] ENVIRONMENT | ACOUSTIC | ACOUSTIC | ~30db, 30~60db, 60db~ |
| | | ECHO | ECHO | |
| | [SOUND] DEVICE | DEVICE [SPEAKER] | OUTPUT CHARACTERISTIC | |
| | | | DIRECTIVITY | |
| | [VIBRATION] ENVIRONMENT | SHAPE | AREA | |
| | [VIBRATION] DEVICE | VIBRATION | AMPLITUDE | |
| | | | FREQUENCY BAND | ~10Hz, 10~100Hz, 100Hz~ |

FIG.17

| OUTPUT TYPE | OUTPUT DEVICE | | | | | | | | | |
|---|---|---|---|---|---|---|---|---|---|---|
| | FIXED | DRIVEN | | | | | | WEARABLE | | |
| | TV | DRIVEN PROJECTOR | | | | | | AR GLASS | | SMARTPHONE |
| DISPLAY | | P1 | P2 | P3 | P4 | P5 | P6 | USER A | | USER B |
| | P7 | 51 | 44 | 92 | 39 | 36 | 8 | 56 | | 25 |
| | 78 | | | | | | | | | |
| SOUND | | DRIVEN PROJECTOR BUILT-IN DIRECTIONAL SPEAKER | | | | | | AR GLASS BUILT-IN SPEAKER | | SMARTPHONE BUILT-IN SPEAKER |
| | | P1 | P2 | P3 | P4 | P5 | P6 | USER A | | USER B |
| | P7 | 21 | 11 | 8 | 33 | 49 | 12 | 37 | | 25 |
| | 60 | | | | | | | | | |
| VIBRA-TION | | | | | | | | AR GLASS BUILT-IN VIBRATOR | | SMARTPHONE BUILT-IN VIBRATOR |
| | | | | | | | | USER A | | USER B |
| | | | | | | | | 9 | | 14 |

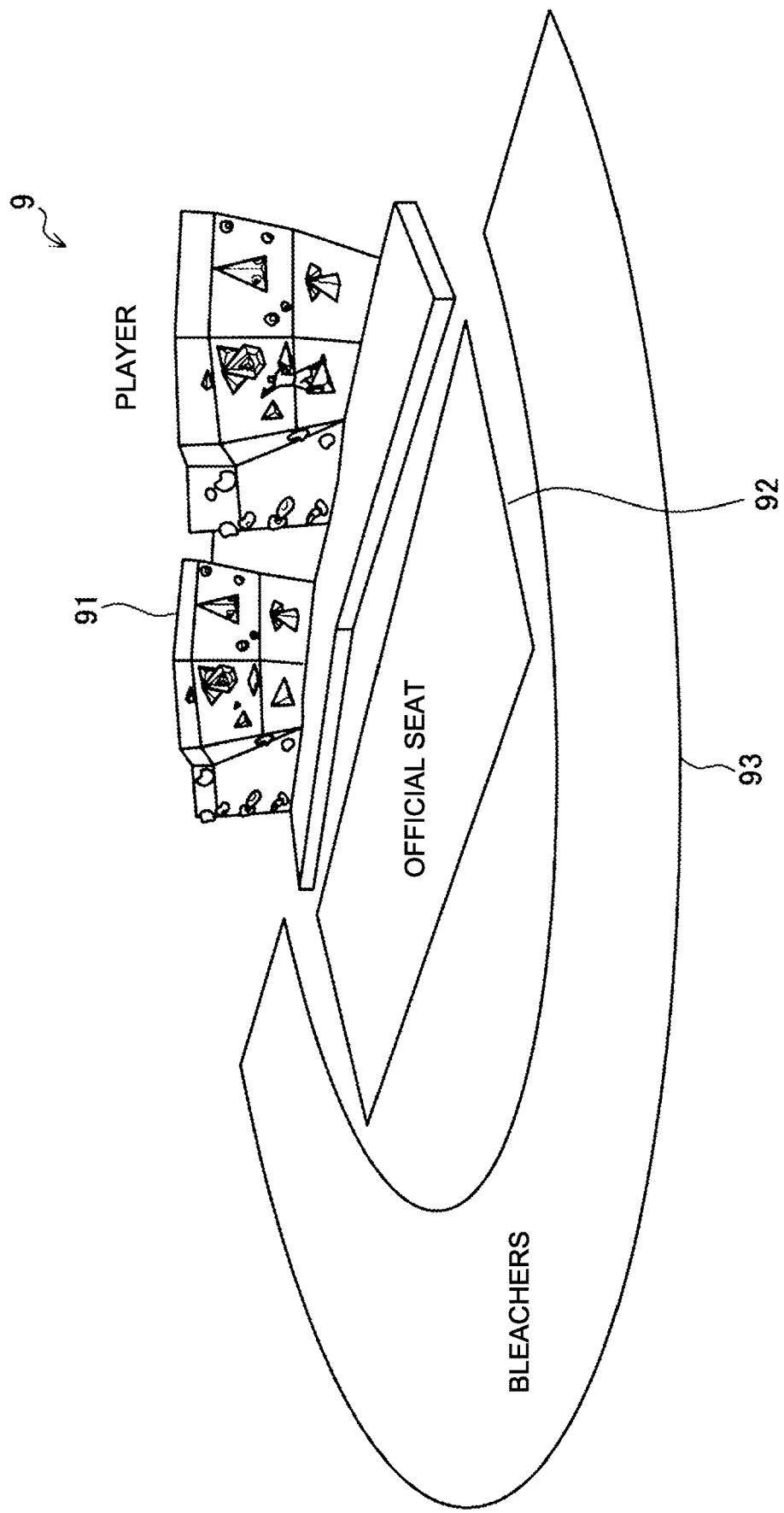

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2018/026110 (filed on Jul. 11, 2018) under 35 U.S.C. § 371, which claims priority to Japanese Patent Application No. 2017-160080 (filed on Aug. 23, 2017), which are all hereby incorporated by reference in their entirety.

FIELD

The present disclosure relates to an information processing apparatus, an information processing method, and a program.

BACKGROUND

Conventionally, when a person receives information presentation, the person needs to move by himself to the front of display information fixed in advance of a television device or the like, for example, or to carry a mobile terminal in the case of using the mobile terminal such as a smartphone.

In recent years, speakers with a directivity and projectors to be driven have been proposed, and it has become possible to form a sound field and output an image at an arbitrary place in a space.

In particular, the projectors have recently been introduced to consumers and business along with downsizing and an increase in brightness. Regarding the projectors, a projection display device that automatically discriminates a projectable area is disclosed in the following Patent Literature 1, for example. Such a projection display device can detect an obstacle or the like using an area sensor such as a depth sensor and determine a projectable area.

In addition, the following Patent Literature 2 discloses an autonomous robot equipped with a projector that can move by itself to a position that is easily viewable by a talking person and perform projection onto a searched optimum projection surface. Such an autonomous robot acquires information on whether or not a projection area is a plane, a color tone and glossiness of the projection area to determine the optimum projection surface.

CITATION LIST

Patent Literature

Patent Literature 1: JP 2015-145894 A
Patent Literature 2: JP 2005-213291 A

SUMMARY

Technical Problem

In the above Patent Literature 1, however, environmental information other than a projection surface is not taken into account, and a watching situation is not sufficient although a shape of the projection surface is measured to estimate an optimum projection size when projecting an image in a space. In addition, there are a plurality of devices such as a television device and a smartphone in the space, but optimization of an output device is not taken into account.

In addition, the above Patent Literature 2 assumes that a projection device is mounted on a single self-propelled robot, and there is no consideration regarding projection devices other than the self-propelled type and optimization of an output device.

In this manner, the optimization of output in response to an environment in a space is not realized, and a person is not released from device restrictions in the related art.

Therefore, the present disclosure proposes an information processing apparatus, an information processing method, and a program that can optimize information output in response to an environment in a space.

Solution to Problem

According to the present disclosure, an information processing apparatus is provided that includes: a recognition unit that recognizes a situation in a space based on sensor data obtained by sensing the space in which a content is output; and a determination unit that determines an output scheme of the content based on a result of the recognition and an analysis result of related information of the content.

According to the present disclosure, an information processing method is provided that causes a processor to execute: recognizing a situation in a space based on sensor data obtained by sensing the space in which a content is output; and determining an output scheme of the content based on a result of the recognition and an analysis result of related information of the content.

According to the present disclosure, a program is provided that configured to cause a computer to function as: a recognition unit that recognizes a situation in a space based on sensor data obtained by sensing the space in which a content is output; and a determination unit that determines an output scheme of the content based on a result of the recognition and an analysis result of related information of the content.

Advantageous Effects of Invention

As described above, it is possible to optimize the information output in response to the environment in the space according to the present disclosure.

Incidentally, the above effects are not necessarily limited, and any of the effects illustrated in the present specification or other effects that can be grasped from the present specification may be exhibited in addition to the above effects or in place of the above effects.

BRIEF DESCRIPTION OF DRAWINGS

FIG. 5 is a table illustrating output result examples of the human recognition process according to the present embodiment.

FIG. 6 is a view illustrating examples of a plane detection result and a projection-inappropriate area in an environment recognition process according to the present embodiment.

FIG. 9 is a view for describing detection of a projection surface when the obstacles are placed in the planar area according to the present embodiment.

FIG. 10 is a view for describing detection of the projection surface when the obstacles are placed in the planar area according to the present embodiment.

FIG. 11 is a table illustrating an example of a detection result of an output device according to the present embodiment.

FIG. 12 is a table illustrating an example of a content analysis result according to the present embodiment.

FIG. 13 is a table illustrating an example of element calculation relating to people according to the present embodiment.

FIG. 14 is a table illustrating an example of element calculation relating to output devices according to the present embodiment.

FIG. 13 is a diagram illustrating graphs when changing an exponent n in an illuminance scoring conversion formula according to the present embodiment.

FIG. 17 is a diagram illustrating a score matrix table according to the present embodiment.

FIG. 18 is a view illustrating people arrangement in a climbing competition according to the present embodiment.

DESCRIPTION OF EMBODIMENTS

Hereinafter, a preferred embodiment of the present disclosure will be described in detail with reference to the accompanying drawings. Incidentally, in the present specification and the drawings, components having substantially the same functional configuration will be denoted by the same reference sign, and the redundant description thereof will be omitted.

In addition, the description will be given in the following order.

1. Overview of Information Processing System According to Embodiment of Present Disclosure
2. Configuration of Information Processing Device 10
3. Operation Processing
3-1. Overall Flow
3-2. Recognition Process
(3-2-1. Human Recognition Process)
(3-2-2. Environment Recognition Process)
(3-2-3. Device Recognition Process)
3-3. Content Analysis Process
3-4. Element Processing
(3-4-1. Element Calculation)
(3-4-2. Element Scoring)
(3-4-3. Weighting of Specific Element)
3-5. Output Scheme Determination Process
4. Application Example
5. Summary

Figure 1:
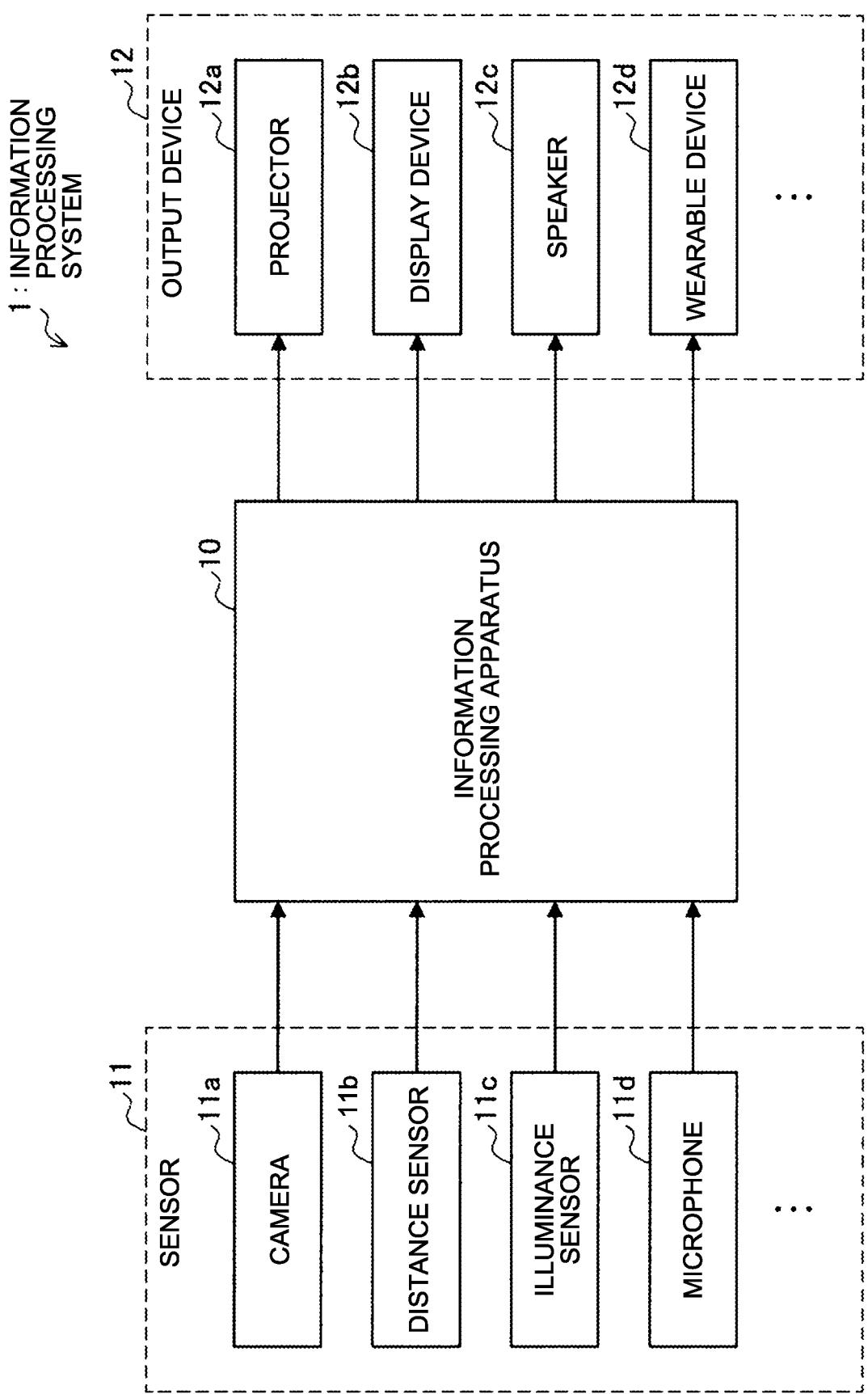
FIG. 1 is a diagram illustrating an overview of an information processing system according to an embodiment of the present disclosure.

1. Overview of Information Processing System According to Embodiment of Present Disclosure FIG. 1 is a diagram illustrating an overview of an information processing system according to an embodiment of the present disclosure. As illustrated in FIG. 1, an information processing system 1 according to the present embodiment includes an information processing apparatus 10, a sensor 11, and an output device 12. Hereinafter, the respective devices included in the information processing system 1 according to the present embodiment will be described.

Sensor 11

The sensor 11 detects surrounding environmental information and outputs the detected information to the information processing apparatus 10. The sensor 11 mainly acquires human-related information and environment-related information. Examples of the human-related information include a position, a posture, a field-of-view area, a line-of-sight direction, a face direction, and the like of one or more users in a space. Examples of the environment-related information include a shape of a projection surface, unevenness, color detection, an obstacle and a shielding object, illuminance information, sound volume, and the like. The sensor 11 may be single or plural. In addition, the sensor 11 may be provided in the output device 12.

The sensor 11 according to the present embodiment is realized by, for example, a camera 11a, a distance sensor 11b, an illuminance sensor 11c, and a microphone 11d as illustrated in FIG. 1, and acquires the human-related information and environment-related information in the space.

The camera 11a images one or more users or a projection area in the space and acquires a captured image. The camera 11a may be single or plural. In addition, an imaging wavelength is not limited to a visible light region, but may include an ultraviolet region and an infrared region, or may be limited to a specific wavelength region. In addition, the camera 11a may be a sensor which measures only illuminance.

The distance sensor acquires a projection distance of a projector 12a (a distance to the projection surface), a watching distance of a user (a distance to each of the output devices 12), and the like. In addition, examples of the distance sensor include a scheme using infrared light as a light source, a scheme using an ultrasonic wave, a scheme using a plurality of cameras, a scheme using image processing, and the like. In addition, the distance sensor may be single or plural, and may collectively acquire distance information within an area.

The illuminance sensor 11c acquires the illuminance at each location in the space. The illuminance sensor 11c may be single or plural.

The microphone 11d collects surrounding sounds and acquires sound data.

Incidentally, the camera 11a, the distance sensor 11b, the illuminance sensor 11c, and the microphone 11d that realize the sensor 11 may be provided in different places or may be provided in the same place.

Information Processing Device 10

The information processing apparatus 10 analyzes the information acquired from the sensor 11 and analyzes a content attribute (some information relating to the content), and then, optimizes information output in response to an environment in a space. In the analysis of sensor data, for example, a three-dimensional positional relationship between a projection display device such as the projector 12a and a projection surface is calculated, and how output information is recognized by a user, for example, how the user recognizes an image output on the projection surface or the like, is analyzed to be used for the optimization of information output.

In addition, in the analysis of the content attribute, when a trigger that delivers the content to the user in any format is fired, the format (text, a video, a sound, or the like) of the content and related information, such as a target person as a delivery destination, urgency, and importance, are analyzed, and the optimization of information output is performed in consideration of the content attribute.

In the optimization of information output, a device (output device 12) optimal to perform information presentation to the user is selected, various parameters which are optimal when performing output with the device are determined, and the device (output device 12) is controlled to perform the optimum information output.

For example, as the parameters, adjustment parameters of a zoom mechanism that adjusts brightness and a size of an image to be projected, a focus mechanism, and the like are assumed in the case of the projector 12a, loudness (a volume parameter) of output is assumed in the case of a speaker 12c, and a setting parameter of a light control element is assumed in the case of an augmented reality (AR) glass (an example of a wearable device 12d)

Incidentally, a specific configuration of the information processing apparatus 10 according to the present embodiment will be described later with reference to FIG. 2.

Output Device 12

The output devices 12 are various devices that performs information presentation to a user according to control of the information processing apparatus 10. For example, the output device 12 is realized by, for example, the projector 12a, a display device 12b, the speaker 12c, or the wearable device 12d as illustrated in FIG. 1. Incidentally, a specific example of the output device 12 is not limited to those illustrated in FIG. 1, and all devices that can present some information to a user, such as a vibration device, a wind output device, an air conditioner, a lighting device, and various actuators, can be additionally assumed. In addition, it is assumed that one or more types of one or more output devices exist in the space.

In addition, the projection display device such as the projector 12a and a sound output device such as the speaker 12c may be fixed in the space or may be capable of performing projection at any place in the space using a projector to be driven. In addition, the display device 12b may be fixed in the space such as a television device or may be a mobile terminal to be carried by the user, such as a smartphone, a mobile phone terminal, and a tablet terminal. In addition, the wearable device 12d is worn by the user, and, for example, a head mounted display (HMD), a smart eye glass (that is, an AR glass), a smart watch, a smart band, a smart neck, a neck-type speaker, an earring-type speaker, an ear cuff-type speaker, and the like are assumed.

The configuration of the information processing system 1 according to the present embodiment has been described above. The respective devices of the information processing system 1 may be installed at different locations or at the same location.

In addition, the respective devices of the information processing system 1 may be configured as separate bodies, or at least some of the devices may be configured as the same body.

2. Configuration of Information Processing Device 10

Figure 2:
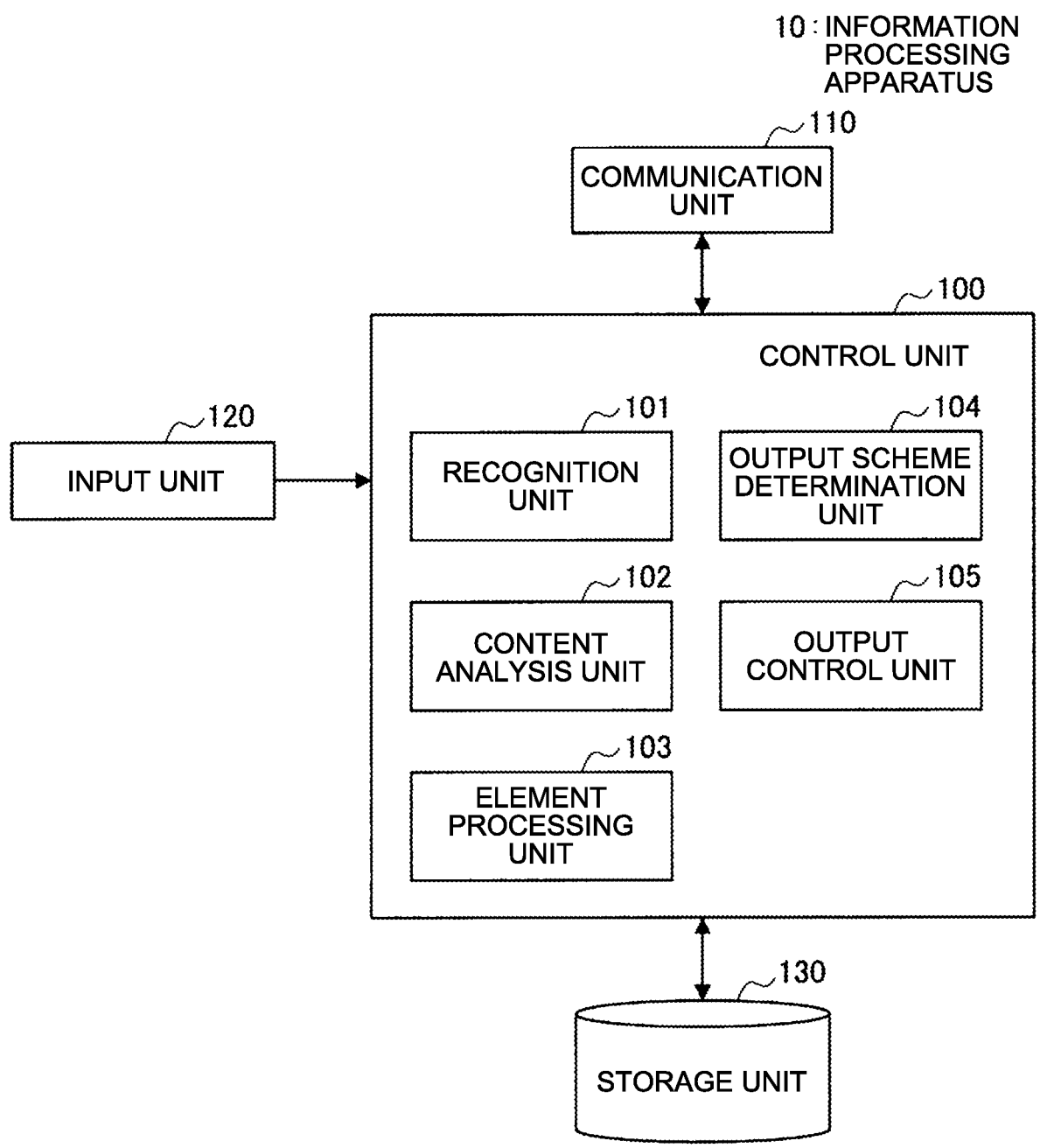
FIG. 2 is a block diagram illustrating an example of a configuration of an information processing apparatus according to the present embodiment.

FIG. 2 is a block diagram illustrating an example of the configuration of the information processing apparatus 10 according to the present embodiment. As illustrated in FIG. 2, the information processing apparatus 10 includes a control unit 100, a communication unit 110, an input unit 120, and a storage unit 130.

The control unit 100 functions as an arithmetic processing device and a control device, and controls the overall operation in the information processing apparatus 10 according to various programs. The control unit 100 is realized by an electronic circuit such as a central processing unit (CPU) and a microprocessor, for example. In addition, the control unit 100 may include a read-only memory (ROM) that stores a program and a calculation parameter to be used, and a random-access memory (RAM) that temporarily stores a parameter that changes as appropriate.

In addition, the control unit 100 according to the present embodiment also functions as a recognition unit 101, a content analysis unit 102, an element processing unit 103, an output scheme determination unit 104, and an output control unit 105.

The recognition unit 101 performs a human recognition process, an environment recognition process, and a device recognition process based on various types of sensor data transmitted from the sensor 11. For example, in the human recognition process, a position and a line of sight of each user, individual identification, posture recognition, behavior recognition, and the like are performed although details of each recognition process will be described later. In addition, in the environment recognition process, an environment in which a user is placed is recognized and an environment optimal for delivery of information is grasped. In addition, in the device recognition process, a state of the device (output device 12) to be used for output is grasped.

As will be described in detail later, the content analysis unit 102 analyzes, for example, a format (a video, text, a sound, a still image, or the like) of the content, a target person who uses the content, presence/absence of user's job (whether the content requires only visual confirmation, a predetermined user operation with respect to the displayed content, or the like), and importance (urgent notification, notification, (ordinary) display, or the like) as information (for example, attributes) relating to a content. These may be determined in advance on the system side or may be analyzed by identifying metadata associated in advance with the content (for example, metadata relating to the content format and target, the predetermined user operation with respect to the content, and the importance). The importance may be automatically detected by learning image information in the case of a video or a still image.

The element processing unit 103 performs processing that relates to an element for determination of an optimum output scheme. For example, elements of a person, such as a watching distance of each user, an angle difference of a projection surface, a visual acuity, and an age, and each element of an environment, such as a display surface shape, a display surface material, project resolution, and a speaker volume, are scored. In addition, the element processing unit 103 weights a score of a specific element based on a content analysis result.

The output scheme determination unit 104 determines an output scheme, that is, an optimum output position, an output device, and various parameters of output based on an analysis result of related information of a content obtained by the content analysis unit 102. The output position corresponds to a position of a planar area in a space (for example, planar areas P1 to P7 illustrated in FIG. 6) in the case of projection output from the projection display device (projector 12*a*) and corresponds to an installation position of each device itself in the case of the display device 12*b*, the speaker 12*c*, or the like. In addition, the output position corresponds to a position of a terminal itself, that is, position of a wearing user in the case of the wearable device 12*d*. In addition, the output scheme determination unit 104 according to the present embodiment may determine the output scheme in consideration of scores of the respective elements based on the content analysis result calculated by the element processing unit 103. Specifically, for example, the output scheme determination unit 104 may determine the output scheme such that output on a large screen is performed by giving priority to a screen size (including a size of a projection surface) when the content is a video. In addition, for example, the output scheme determination unit 104 may determine image output at a location closest to a user by giving priority to closeness of a distance between an output position (a projection position or a display position) and the user in consideration of a touch operation performed by the user when the content is a touch user interface (UI). In addition, for example, the output scheme determination unit 104 may determine the output scheme by giving priority to the output resolution (resolution of the output device 12) such that even a fine character can be visually recognized when the content is mainly a character (for example, a WEB content, an electronic book, or the like). The output resolution is resolution per predetermined display area that can be visually recognized by the user. In addition, for example, the output scheme determination unit 104 may determine the output scheme by giving priority to a situation of a sound field at the output position such that a sound is output from a quieter place or such that a sound is output from a position where it is easier for the user to hear the sound in consideration of user's position when the content is the sound.

The output control unit 105 performs predetermined output control on the predetermined output device 12 in accordance with a content determined by the output scheme determination unit 104. Specifically, the output control unit 105 performs control such that a control signal and content data for control to perform output in the determined output scheme are transmitted from the communication unit 110 to the output device 12.

Communication Unit 110

The communication unit 110 transmits and receives data to and from an external device directly or via a network in a wired or wireless manner. For example, the communication unit 110 is connected to the sensor 11 and the output device 12 for communication using a wired/wireless local area network (LAN), Wi-Fi (registered trademark), Bluetooth (registered trademark), near-field communication, or the like. For example, the communication unit 110 transmits the control signal and content data for control of the predetermined output device 12 to perform output in the determined output scheme to the output device 12 according to the control of the output control unit 105.

Input Unit 120

The input unit 120 receives information input to the information processing apparatus 10. For example, the input unit 120 may be an operation input unit that receives an operation instruction from a user. The operation input unit may be a touch sensor, a pressure sensor, or a proximity sensor. Alternatively, the operation input unit may have a physical configuration such as a button, a switch, and a lever. In addition, the input unit 120 may be a sound input unit (microphone).

Storage Unit 140

The storage unit 140 is realized by a read-only memory (ROM) that stores a program and a calculation parameter to be used for processing of the control unit 100 and a random-access memory (RAM) that temporarily stores a parameter that changes as appropriate.

The storage unit 140 stores display information (content). Incidentally, the display information may be transmitted from an external device via the communication unit 110.

The configuration of the information processing apparatus 10 according to the present embodiment has been specifically described above. Incidentally, the configuration of the information processing apparatus 10 according to the present embodiment is not limited to the example illustrated in FIG. 2, and may further include an output unit, for example. The output unit may be realized, for example, by a display unit or a sound output unit (microphone). The display unit outputs an operation screen, a menu screen, or the like, and may be a display device such as a liquid crystal display (LCD) and an organic electro luminescence (FL) display.

In addition, the information processing apparatus 10 may be configured using a plurality of devices. In addition, the information processing apparatus 10 may be realized by a client device (a smartphone, a tablet terminal, a personal computer (PC), or the like), or may be realized by a server on a network.

3. Operation Processing

Next, the operation processing of the information processing system according to the present embodiment will be specifically described with reference to the drawings.

3-1. Overall Flow

Figure 3:
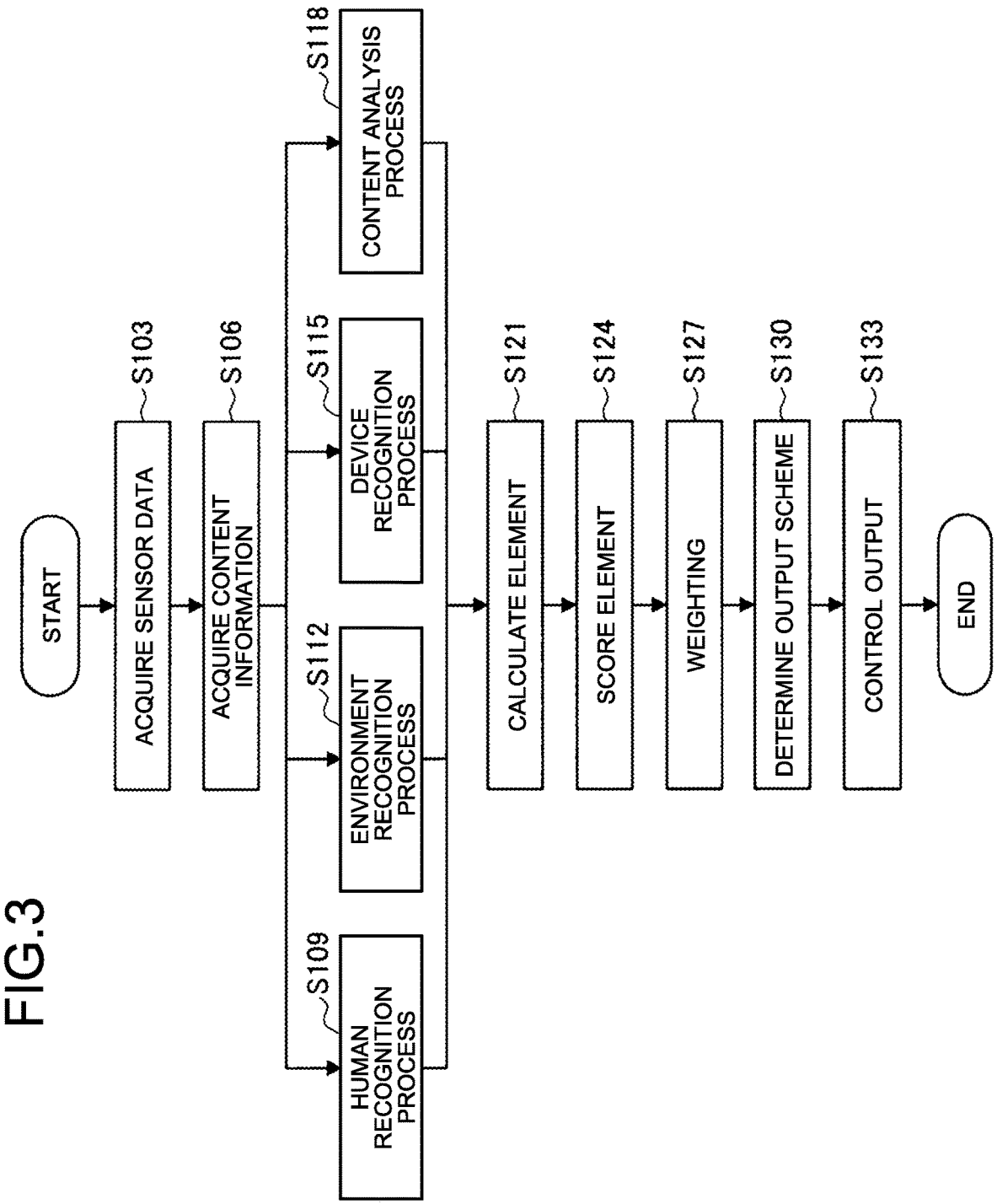
FIG. 3 is a flowchart illustrating an output control process according to the present embodiment.

First, an output control process according to the present embodiment will be described with reference to FIG. 3. FIG. 3 is a flowchart illustrating the output control process according to the present embodiment.

As illustrated in FIG. 3, the information processing apparatus 10 first acquires sensor data from the sensor 11 (Step S103), and then, acquires content information (Step S106). The sensor data may be continuously acquired from the sensor 11 or may be acquired when content information is acquired. Regarding the acquisition of content information, information such as attributes of a content is acquired from an external device or the storage unit 130 when a trigger to deliver the content to a person is fired in a certain way (reception of a message, incoming call, push notification, an interphone (a visitor), an output instruction from a user, or the like).

Next, the recognition unit 101 of the information processing apparatus 10 performs a recognition process on a person such as a position and a line-of-sight direction of each user existing in a space (Step S109), a recognition process on an environment such as plane detection in the space, illuminance, and a sound field (Step S112), and a recognition process on a device such as a form, an output position, and a state of the output device 12 existing in the space (Step S115).

Next, the content analysis unit 102 performs content analysis such as a format and a target person of the content, presence/absence of a job, and importance (Step S118).

Next, the element processing unit 103 performs element calculation for determination of an output scheme (Step S121), and scores an element based on the calculated element (Step S124).

Next, the element processing unit 103 performs weighting of each element score based on a content analysis result (Step S127).

Subsequently, the output scheme determination unit 104 determines an optimum output scheme in response to the environment based on the element score (Step S130), and the output control unit 105 performs content output control according to the determined output scheme (Step S133).

The overall flow of the information processing system according to the present embodiment has been described above with reference to FIG. 3. Next, a process in each of the above-described steps will be described in detail.

3-2. Recognition Process 3-2-1. Human Recognition Process

Figure 4:
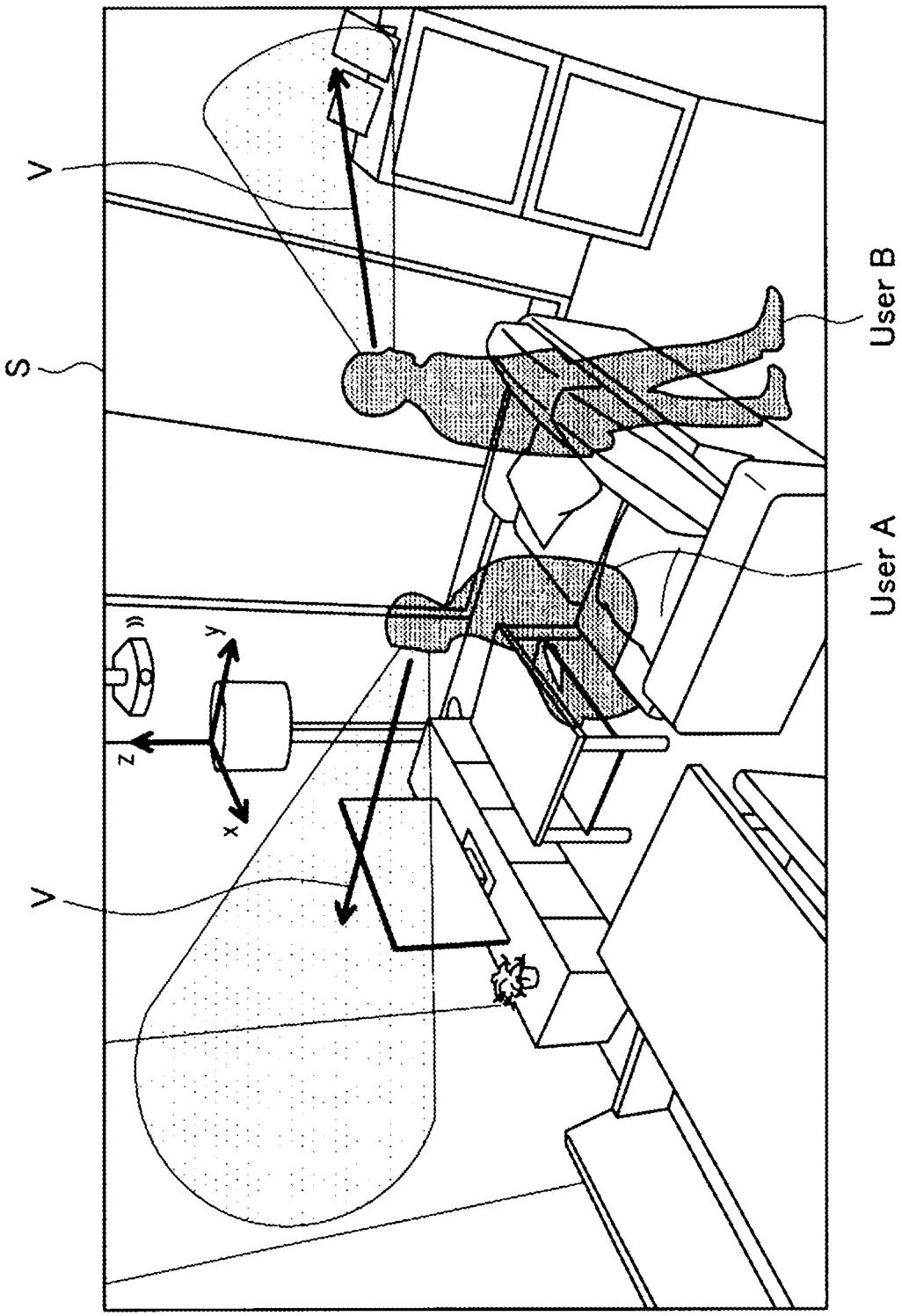
FIG. 4 is a view illustrating a human recognition process existing in a space according to the present embodiment.

In the human recognition process, a position and a line-of-sight direction of one or more users existing in a space, individual identification, posture recognition, behavior recognition, and the like are performed based on the sensor data. FIG. 4 is a view illustrating the human recognition process according to the present embodiment. When there are a plurality of users (a user A and a user B) in a space S as illustrated in FIG. 4, the recognition unit 101 can acquire a position and a view vector V (line-of-sight direction) of each user as three-dimensional coordinate positions (x, y, z). In addition, the recognition unit 101 can also acquire a state (a posture and a behavior) of each user.

Here, FIG. 5 illustrates an example of an output result of the human recognition process. For example, as illustrated in FIG. 5, the recognition unit 101 can acquire position coordinates, a field-of-view vector, a posture, a behavior, and the like of each user. The position coordinates of each user may be calculated by acquiring position information from, for example, a smartphone, a smart watch, an AR glass, or the like owned by each user. Incidentally, the recognition unit 101 can also recognize the space S (grasp a three-dimensional shape of the space). For example, the recognition unit 101 acquires object information in a surrounding space based on the sensor data (object recognition), recognizes a layout in the space, and grasp the position coordinates of each user in the layout. Incidentally, the acquisition of position coordinates is not limited to the position information transmitted from a communication terminal owned by the user, and position coordinates can be acquired by reflection of light, for example, when the user wears a material having a retroreflection function. In addition, it is also possible to perform specifying of a user position, individual identification (face recognition), and estimation of a face direction based on a captured image in the space. In addition, it is also conceivable to use a thermo camera, an ultrasonic sensor, laser surveying, or the like.

3-2-2. Environment Recognition Process

In the environment recognition process, it is possible to grasp an environment optimal to transmit information by recognizing the environment where a user exists.

Here, an example of an environment recognition result will be described with reference to FIGS. 6 to 10.

FIG. 6 is a view illustrating examples of a plane detection result and a projection-inappropriate area. The recognition unit 101 analyzes various types of sensor data and detects the planar areas P1 to P7 in the space S as illustrated on the left in FIG. 6 and determines projection-inappropriate areas 21 to 23 as illustrated on the right in FIG. 6. For recognition of a projection surface such as the plane detection result and the projection-inappropriate area, the laser surveying (for example, light detection and ranging (LIDAR)) used in the human recognition process and ultrasonic sensor data, distance sensor data, a captured image, an object recognition result, or the like may be used.

In addition, whether each detected plane has a material, a color, and illuminance suitable for projection of an image may be recognized together in the recognition of the projection surface. Such recognition of the color, unevenness, or brightness of a plane is performed in order to avoid a case where an image becomes darker to be hardly viewable depending on a positional relationship between a projector and the plane (projection surface) when the output is image projection using the projector, a case where the visibility becomes low when the color of the projection surface is close to a color to be projected, or a case where the image is not projectable in the first place because the project plane is glass or the like.

Figure 7:
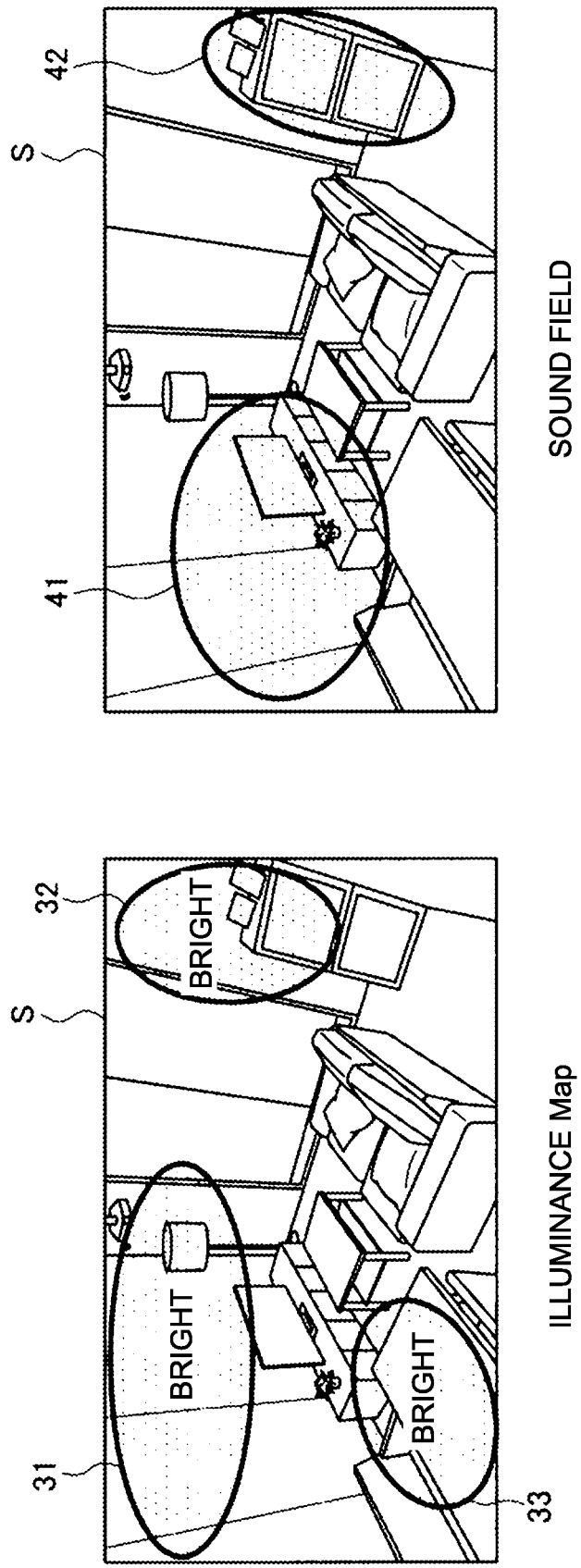
FIG. 7 is a view illustrating examples of an illuminance map and sound field recognition according to the present embodiment.

FIG. 7 is a view illustrating examples of an illuminance map and sound field recognition. In the illuminance map, the illuminance at each location in the space S is recognized, and bright and dark locations in the space S are grasped as illustrated on the left in FIG. 7. It is assumed that sensor data acquired from a camera sensor, an illuminance sensor, or the like is used to recognize the illuminance at each location. In addition, a quiet place or a noise place, a place where it is difficult to hear/easy to hear a sound, and the like in the space S are grasped in the sound field recognition. The sound field recognition may estimate a sound field from a position of a speaker installed in the space S or use sensor data acquired from a microphone, a gyro sensor, or the like provided in the space S or a wearable device (such as an AR glass or a smartphone).

The recognition of the projection surface and the recognition of the sound field and the illuminance map described above can be performed together with space recognition (grasping a three-dimensional shape of the space), which is similar to the human recognition process. Incidentally, when there is only a public facility or a large structure that hardly changes in the state of the environment, a drawing of a space, information on a three-dimensional shape of the space, and the like may be registered in the information processing apparatus 10 in advance.

Figure 8:
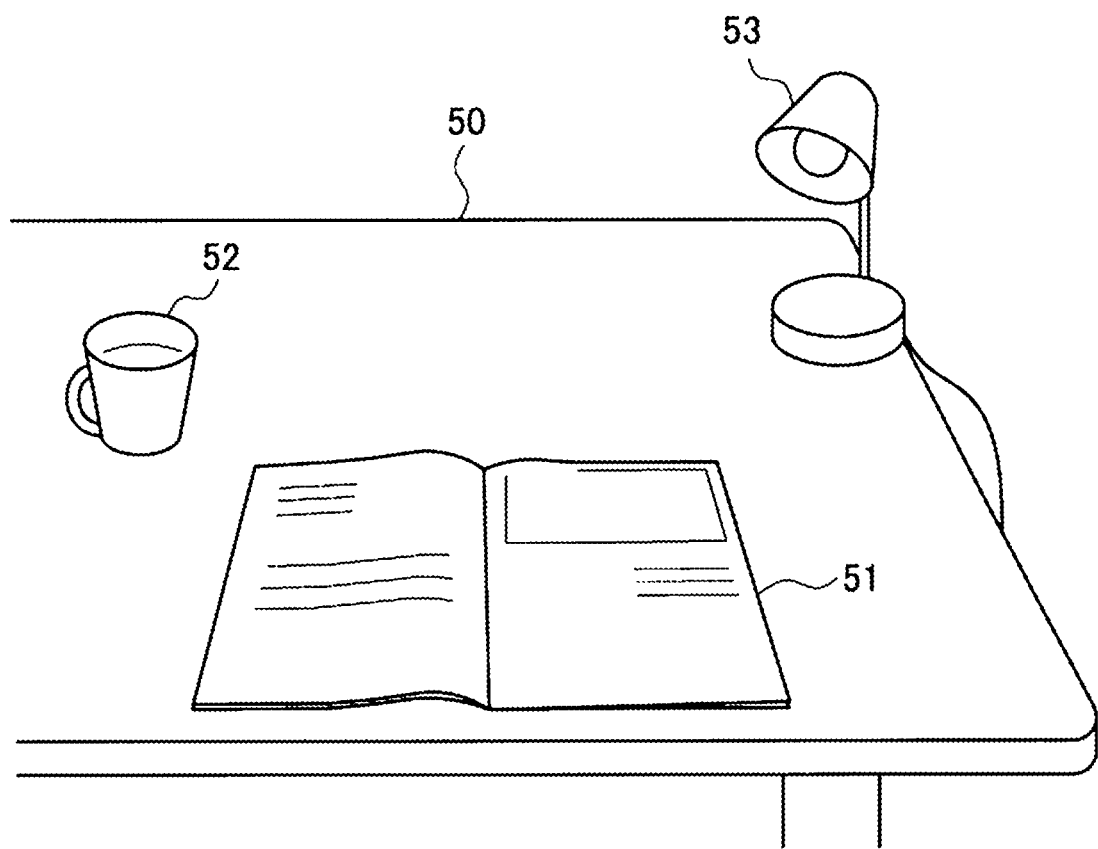
FIG. 8 is a view for describing a case where obstacles are placed in a planar area according to the present embodiment.

In addition, there is a case where a plurality of obstacles exist in a detected plane. When a plurality of obstacles 51 to 53, such as a cup and a book, are placed in a planar area 50, for example, as illustrated in FIG. 8, the recognition unit 101 may detect a plurality of rectangles excluding areas of the obstacles 51 to 53 as projection surface candidates 61 to 66 as illustrated in FIG. 9. In addition, a range covering the periphery of the obstacles 51 to 53 may be detected as the projection surface candidate 66 as illustrated in FIG. 10.

3-2-3. Device Recognition Process

In the device recognition process, a state of the output device 12 existing in a space is grasped. Here, FIG. 11 illustrates an example of a detection result of the output device 12. As illustrated in FIG. 11, for example, information, such as a form (fixed/driven/wearable) of the output device 12, an output-possible position (the number of output-possible positions), responsiveness (startup time or time taken for information presentation), a state (standby/being started/being used), and an output type (display/sound vibration), is acquired for each name and ID of the output device 12. These pieces of information may be received through communication connection with the output device 12 or may be acquired by analyzing sensor data acquired from a camera sensor, a microsensor, or the like in the space S.

Since the "state" and "responsiveness" are also grasped, it is possible to avoid a case where it is difficult to use an appropriate device at an appropriate timing. For example, it is difficult to immediately present information when an output device is already being used by another user or when an output device is powered off and needs to be started (a drive time for turning to a projection direction is also required in the case of a drive-type projector). For example, when there is an attempt to present information to the periphery of a user who is walking, the user passes by a space and it is difficult to perform the information presentation at an appropriate timing with the above-described output device that is being used or output device that requires time for response.

In addition, since the performance of the device is also grasped in advance, for example, when the maximum output of a speaker is insufficient with respect to the volume of the environment, the use of the speaker can be avoided.

3-3. Content Analysis Process

In the content analysis process, analysis is performed regarding a format (a video, text, a sound, a still image, or the like) of a content, a target person who uses the content, presence/absence of user's job (whether the content requires only visual confirmation and a predetermined user operation with respect to the displayed content (for example, whether an image editing operation for an image content occurs, what kind of operation occurs such as a direct touch operation on the content or a gesture operation by motion at a point away from the content, or the like), and importance (urgent notification, notification, and (ordinary) display). Attributes thereof may be determined in advance on the system side or may be analyzed by identifying metadata associated in advance with the content (for example, metadata relating to the content format and target, the predetermined user operation with respect to the content, and the importance). The importance may be automatically detected by learning image information in the case of a video or a still image.

Here, FIG. 12 illustrates an example of the content analysis result. As illustrated in FIG. 12, a target person, a request, and a format are analyzed for each content. An "interphone" illustrated in FIG. 12 sounds the doorbell, and the target person is all users (a user A and a user B) in a room. In addition, the presence/absence of the job is none since "notification" is set, and the importance is "immediate notification to user A and user B". The format is, for example, a captured image (a still image and a full color) obtained by imaging a person who rings the doorbell, In addition, a "message" illustrated in FIG. 12 is information addressed to an individual, such as notification in social networking service (SNS), a mail, and push notification from a predetermined application, and the target person is only the "user B", for example, in consideration of privacy, and user A who is in the same space is a target-exempt person. As the target-exempt person is set, an output device is determined such that only the user B can see the notification (for example, an AR glass, a smartphone, or the like worn by the user).

The touch UI input is to input some information by touching an operation input screen, and the target-exempt person is not particularly set as illustrated in FIG. 12, for example, when a content may be viewed by people other than the target person. In addition, the touch UI input requires an active input operation by the user.

3-4. Element Processing

Next, element processing to determine an output scheme will be described.

3-4-1. Element Calculation

The element processing unit 103 calculates an element for each of a plurality of users and the output devices 12 based on a recognition result obtained by the recognition unit 101. FIGS. 13 and 14 are tables illustrating an example of element calculation.

For example, the element processing unit 103 calculates elements relating to people as illustrated in FIG. 13 based on the position and line-of-sight direction (see FIG. 4) of the person detected by the human recognition process and the position (see FIG. 6) of the plane (projection surface) detected by the environment recognition process. In addition, the element processing unit 103 calculates elements relating to output devices as illustrated in FIG. 14 based on the position of the plane (projection surface) detected by the environment recognition process (see FIG. 6) and the detection result of each of the output devices 12 (see FIG. 11). Incidentally, since a plurality of projection surfaces can be detected as illustrated in FIG. 6, an angle difference between a person and a projection surface, a shape and a material of a projection surface, environment illuminance, and the like can be calculated for each projection surface.

3-4-2. Element Scoring

Next, optimum output positions (positions of the output device 12 and the projection surface) are determined based on the elements calculated as above, but it is difficult to compare the positions because the units of the elements are different. Therefore, each element is scored, and one score is calculated for each of the output devices 12 or the projection surfaces in the present embodiment. The scoring may be performed by categorizing each element into four to five levels or creating a specific conversion formula. Hereinafter, specific examples of the conversion formula used for the scoring will be described.

For example, a score of a size of a projection surface in an environment (a projection surface score S_[surface]) is obtained by the following Formula 1.

$$S_{[surface]} = k_{[surface]} \frac{x - S_{[min]}}{S_{[max]} - S_{[min]}} \quad \text{Formula 1}$$

In the above Formula 1, the maximum value and the minimum value of a projection size that can be taken in the environment are defined, in advance, as S_[Max] and S_[Min], respectively, in order to obtain the projection surface score S_[surface]. In addition, an element weighting coefficient k_[surface] is basically set to 1, but the coefficient may be changed in response to a content. Details will be described later. If k=1 at this time, a numerical value from 0 to 1 is obtained for S_[surface] with respect to a projection size x. When such a method is applied to each element, a score excluding the unit of each element can be calculated.

In addition, regarding the conversion formula for the scoring, there is a case where a human sense distribution and a score distribution are not linearly proportional. The illuminance will be described as an example. The illuminance [lux] is tens of luxes at midnight, 200 to 300 lux when a room lighting is turned on, and several hundred lux to 1,000 lux even in a bright place, but is hundreds of thousands of luxes when direct sunlight shines from the outside. Thus, the maximum lux S_[max] that can be taken is too large in the above Formula 1, and thus, the amount of change at midnight or when the room lighting is turned on becomes small so that characteristics of the element are lost when the total value of scores is calculated. Therefore, when a range of each element has a distribution biased with respect to human characteristics such as an exponential function and a logarithm, the following Formula 2, obtained by adding an exponent n of power to the above Formula 1, may be used.

$$S_{[illuminance]} = k_{[illuminance]} \left( \frac{x - S_{[min]}}{S_{[max]} - S_{[min]}} \right)^n \quad \text{Formula 2}$$

Figure 15:
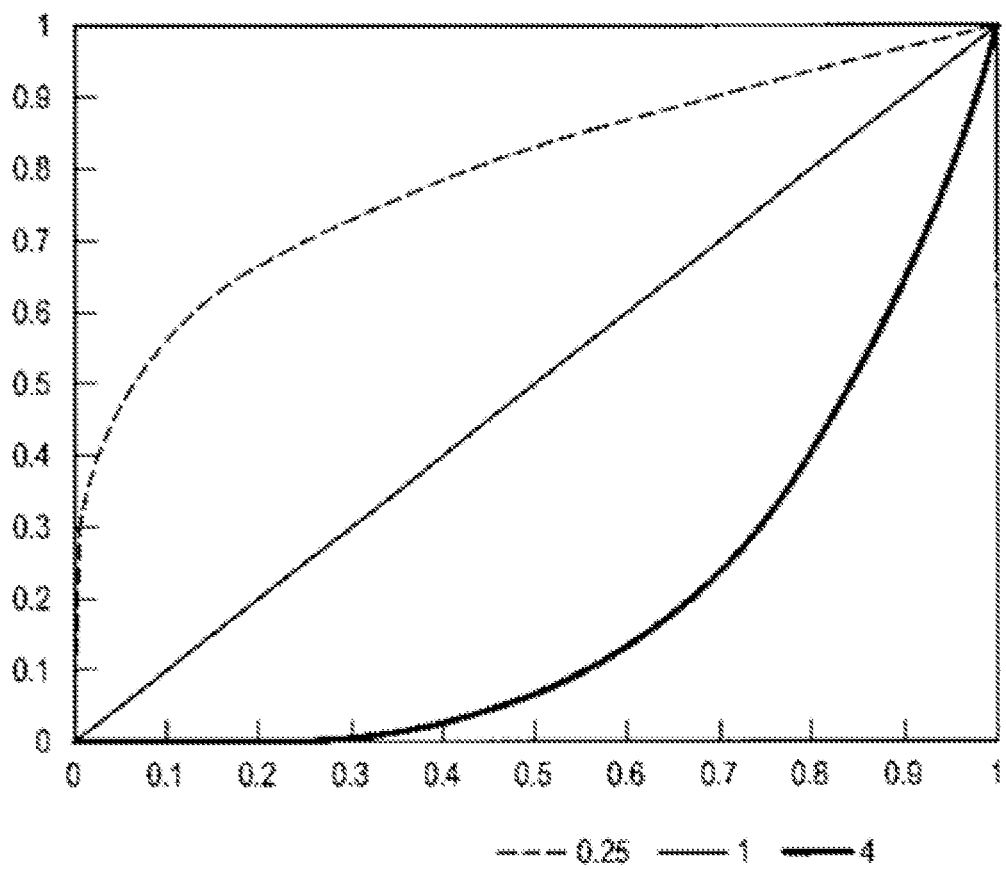

As a result, in the case of the illuminance, a score dealing with a minute change can be calculated in a section with a small value by setting the exponent n to a value of 1 or less such as n=0.25. In addition, when dealing with a minute change in a section with a large value, it is possible to deal with the change by setting the exponent n of power to 1 or more. Here, FIG. 15 illustrates a graph when the exponent n is changed. FIG. 15 illustrates trends when the exponent n of power is 0.25, 1, and 4 for input of 0 to 1, respectively. Incidentally, the exponent is not changed for each output position, but is used in the state of being fixed for each environment. However, the exponent may be corrected to a value suitable for an environment when there are different environments.

In addition, there are elements in which input value characteristics have only a few levels of change among the respective elements. Such elements may be categorized into several levels of scores. As an example, when it is desired to set an age to values in three levels, such as 18 years or younger, 18 to 40 years, and 40 years or older, the following Formula 3 may be used.

$$S_{[age]} = \begin{cases} k_{[age]} & (x >= 40) \\ 0.75 k_{[age]} & (40 > x > 18) \\ 0.5 k_{[age]} & (18 >= x) \end{cases} \quad \text{Formula 3}$$

3-4-3. Weighting of Specific Element

As described above, an output position can be determined by calculating one score for each of the projection surfaces and the output devices 12 (that is, output position) and selecting the highest score from among the calculated scores. When the characteristics of the content are further considered, it is possible to realize the optimum scoring.

Therefore, the respective elements are weighted based on the content analysis result as illustrated in FIG. 12 to enable reflection of user's intention.

Here, the following Table 1 show an example of a weighting coefficient of each element k in a specific content.

TABLE 1

| Content example | k_[projection size] | k_[distance between projection surface and user] | k_[resolution of projection surface] |
|---|---|---|---|
| Movie | 1 or more | 1 or more | 1 |
| Text | −1 or less | −1 or less | 1 or more |
| Touch UI | 1 | −1 or less | 1 or more |

Regarding each element, when the above Formula 1 is adopted, for example, a larger projection size has a higher score, and a score becomes higher if a distance between a projection surface and a user is longer. Here, as shown in the above Table 1, weighting coefficients of k_[projection size] and k_[distance between projection surface and user] are set to 1 or more such that priority is given to a screen size even when a watching distance is long regarding, for example, a video content that is desirably viewed on a large screen such as a movie. In addition, when detailed information such as Touch UI and text that allows user's input is displayed, weighting of k_[distance between projection surface and user] is set to −1 or less since a shorter watching distance is prioritized over the screen size. As a result, a higher score can be set as the distance is short. In addition, k_[resolution of projection surface] may be set to 1 or more such that a character and the like can be visually recognized even for fine information.

In this manner, the influence of each element characteristic is further increased when the weighting coefficient is 1 or more, and the element characteristic can be ignored when the weighting coefficient is close to 0. In addition, such a characteristic can be reversed by changing a sign.

3-5. Output Scheme Determination Process

Next, the output scheme determination process performed by the output scheme determination unit 104 will be described with reference to FIGS. 16 and 17. The output scheme determination unit 104 integrates weighted scores of the respective elements to calculate one sore for each of output positions (for example, positions of each of the projection surfaces (planar areas P1 to P7), the display device 12b, the speaker 12c, and the wearable device 12d in the space). In addition, an optimum output scheme is selected from combinations of the plurality of output devices 12 and output types (for example, display, a sound, a vibration, and the like).

Figure 16:
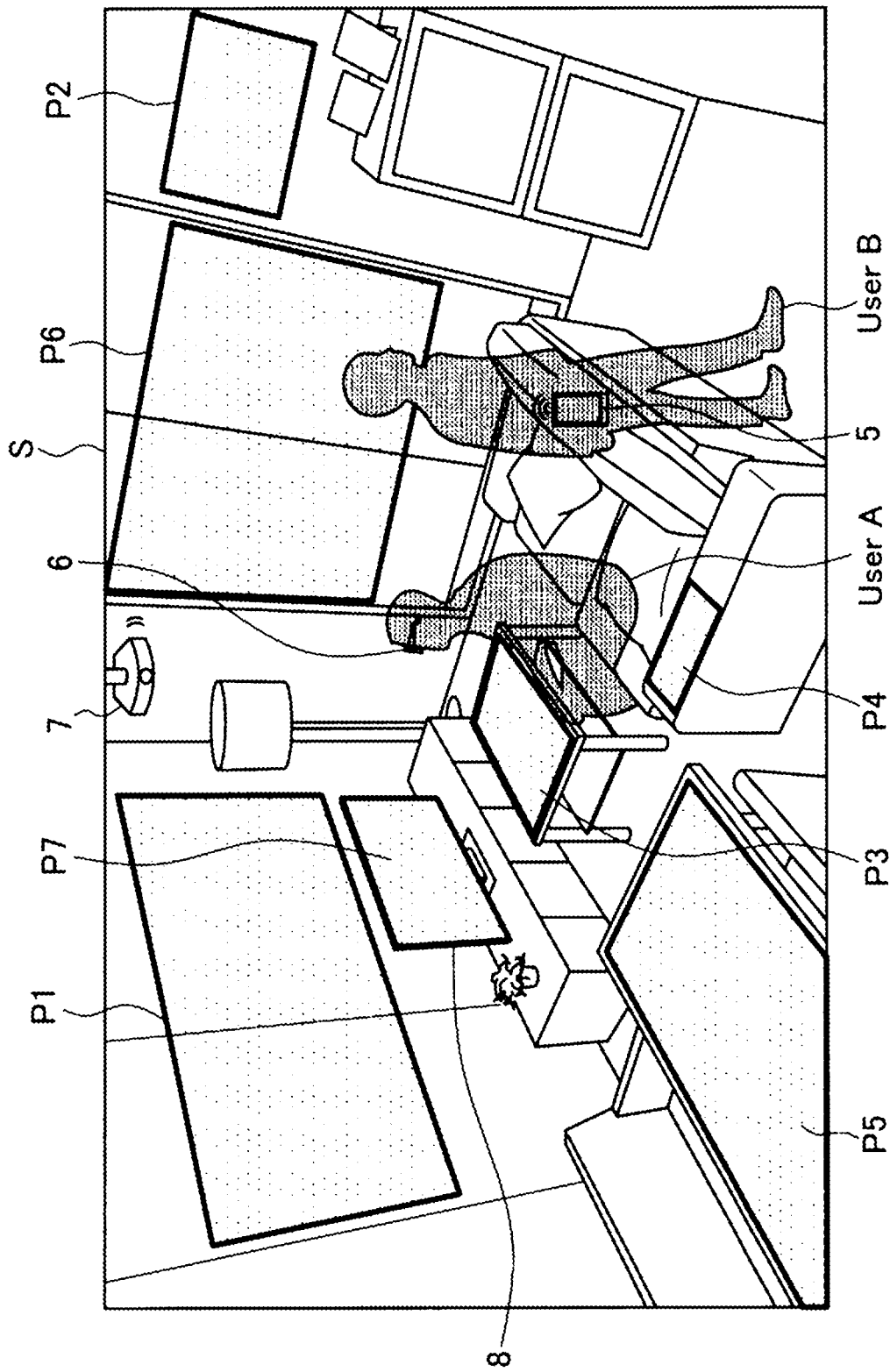
FIG. 16 is a view illustrating an environment in a space and a positional relationship between a person and an output device according to the present embodiment.

Here, FIG. 16 illustrates an environment in a space and a positional relationship between a person and an output device. As illustrated in FIG. 16, for example, a user A and a user B exist in a space, a smartphone 5 (owned by the user B), an AR glass 6 (owned by the user A), a TV device 8, and a drive-type projector 7 exist as the output devices 12, and planar areas (projection surfaces) P1 to P7 are detected by plane detection.

At this time, FIG. 17 illustrates a score matrix table for each of the output devices 12, output types (display, a sound, a vibration), and output positions (positions of the projection surfaces and the output devices 12). Since there may be six output positions of the "display" and "sound" of the drive-type projector 7, a score is calculated for each of the six positions of the planar areas P1 to P6.

In addition, since the AR glass 6 is owned by the user A, the output position is the "user A". In addition, since the smartphone 5 is owned by the user B, the output position is the "user B".

Each score illustrated in FIG. 17 is obtained by scoring the elements calculated as illustrated in FIGS. 13 and 14 and weighting the scores of the elements in response to a content. For example, when a content to be output is "ID3, Touch UI, Target Person: User A" illustrated in FIG. 12, weighting is performed such that the score becomes higher when an element exists near the user A, and for example, a value of the planar area P3 (table) existing near the user A is high as a display position of the drive-type projector. The output scheme determination unit 104 may select a combination of the output device 12 and an output type having the highest score, and an output device used for an image and an output device used for sound output may be different when both the image and sound are used.

In addition, when a plurality of scores are in the same column, an element with a large absolute value of each weighting coefficient illustrated in the above Table 1 may be prioritized. For example, when a content to be output is "ID3, Touch UI, Target Person: User A" illustrated in FIG. 12, a distance between a projection surface and the user A and resolution are prioritized over a projection size, and thus, one candidate can be narrowed down through selection based on the distance to the user from among the plurality of projection surfaces (planar areas P1 to P6).

In addition, the output scheme determination unit 104 may calculate movement cost individually in response to a state of each user when it is necessary to cause a plurality of users to turn toward one screen such as a case where an image of a large screen is presented to a plurality of people. The output position may be determined by calculating tuning cost in consideration of not only a position of a person but also a state of the person or furniture in contact with the person, for example, by estimating low turning cost for a standing person and high turning cost for a person sitting on a chair, particularly when the chair has an immovable structure. In addition, the turning cost may be calculated in consideration of a user attribute such as an age (a child or an adult).

In addition, one content is not necessarily presented on one screen, and a plurality of peripheral projection surfaces may be combined so as to satisfy a size required by the content.

In addition, it is necessary to present an image while a user is moving so as not to disturb user's movement and riot to distract user's line of sight. For this reason, when the user is moving, an element depending on the user's line of sight is weighted to be high or a movement route of the user is predicted, thereby confirming whether a projection surface continues on the route. When areas where it is difficult to present the image intermittently exist along the predicted movement route, an environment is not optimal, and thus, a content may be presented from the beginning using a smartphone or an AR glass to be continuously watchable.

In addition, when a plurality of categories are mixed as characteristics of a content, the content may be divided until the characteristic is limited in the content, and display may be performed on different projection surfaces for different categories. For example, a video content and explanatory text of the content exist in an Internet video site, and thus, a video may be displayed on a larger surface, and the explanatory text may be displayed in a place where projection can be with high resolution near a user.

4. Application Example

The information processing system according to the present embodiment can be applied not only to an indoor living environment but also to a public facility and a sports game. For example, an example of a climbing competition that is a large facility will be described with reference to FIG. 18.

FIG. 18 is a view for describing people arrangement in the climbing competition. As illustrated in FIG. 18, for example, in a climbing competition facility 9, a climbing wall 91 is arranged in front, official seats 92 are arranged in front of the climbing wall 91, and bleachers 93 are placed so as to surround the official seats 92.

At this time, display (for example, an error, fouling, or the like) related to a discussion for players and a display (for example, player information, scores, comments, or the like) for spectators are assumed as a content that is to be presented. During content analysis, the information processing system 1 according to the present embodiment can set a target person and a target-exempt person and determine an optimum output position as appropriate. For example, the display of the content relating to the discussion for players can be output from a place close to selection or a wearable device owned by a player, and the content for a large number of spectators may be projected onto a larger projection surface such that everyone can view the content.

5. Summary

As described above, it is possible to optimize the information output in response to the environment in the space in the information processing system according to the embodiment of the present disclosure.

The preferred embodiment of the present disclosure has been described in detail as above with reference to the accompanying drawings, but the present technique is not limited to such an example. It is apparent that those who have ordinary knowledge in the technical field of the present disclosure can conceive various change examples or modification examples within a scope of the technical idea described in the claims. Of course, it is understood that these examples also belong to the technical scope of the present disclosure.

For example, it is also possible to create a computer program configured to cause the hardware such as the CPU, the ROM, and the RAM built in the information processing apparatus 10, the sensor 11, or the output device 12 described above to exhibit the function of the information processing apparatus 10, the sensor 11, or the output device 12. In addition, it is also possible to provide a computer-readable storage medium storing the computer program.

In addition, the effects described in the present specification are merely illustrative or exemplary and are not limited. That is, the technique according to the present disclosure can exhibit other effects that are apparent to those skilled in the art from the description of the present specification in addition to or in place of the above effects.

Incidentally, the present technique can also have the following configurations.

(1)

An information processing apparatus comprising:
a recognition unit that recognizes a situation in a space based on sensor data obtained by sensing the space in which a content is output; and
a determination unit that determines an output scheme of the content based on a result of the recognition and an analysis result of related information of the content.

(2)

The information processing apparatus according to (1), wherein
the analysis result of the related information of the content includes a format of the content, a target person who uses the content, a job on the content, or importance of the content.

(3)

The information processing apparatus according to (2), wherein
the recognition unit performs a recognition process on a user existing in the space as the situation in the space.

(4)

The information processing apparatus according to (3), wherein
position coordinates, a field-of-view direction, and a state of the user are recognized as the recognition process on the user.

(5)

The information processing apparatus according to any one of (2) to (4), wherein
the recognition unit performs a recognition process on an environment around a user existing in the space as the situation in the space.

(6)

The information processing apparatus according to (5), wherein
at east one of detection of a planar area in the space, generation of an illuminance map, and sound field recognition is performed as the recognition process on the environment.

(7)

The information processing apparatus according to any one of (2) to (6), wherein
the recognition unit performs a recognition process on an output device existing in the space as the situation in the space, (8)

The information processing apparatus according to any one of (2) to (7), wherein
the determination unit determines an output position, an output device, and an output parameter of the content as the output scheme.

(9)

The information processing apparatus according to (8), wherein
the output position is a position of a planar area in the space in a case of projection output from a projection display device.

(10)

The information processing apparatus according to (8), wherein
the output position is an installation position of the output device.

(11)

The information processing apparatus according to (8), wherein
when the output device is a wearable device, the output position corresponds to a position of a user wearing the wearable device.

(12)

The information processing apparatus according to any one of (8) to (11), wherein
the determination unit determines the output position based on a score for each output position calculated based on a score of each element calculated based on a recognition result of an environment and a user obtained by the recognition unit and weighted depending on the analysis result of the related information of the content.

(13)

The information processing apparatus according to any one of (8) to (12), wherein
the determination unit determines the output scheme by giving priority to a screen size based on the analysis result of the content when the content is a video.

(14)

The information processing apparatus according to any one of (8) to (13), wherein
the determination unit determines the output scheme by giving priority to closeness of a distance between an output position and a user when the content is a touch UI.

(15)

The information processing apparatus according to any one of (8) to (14), wherein
the determination unit determines the output scheme by giving priority to output resolution when the content is mainly a character.

16

The information processing apparatus according to any one of (8) to (15), wherein
the determination unit determines the output scheme by giving priority to a situation of a sound field at an output position when the content is a sound.

17

The information processing apparatus according to any one of (8) to (16), wherein
the determination unit determines the output scheme by giving priority to a line-of-sight direction of a user when the content is an image and the user is moving.

18

The information processing apparatus according to any one of (1) to (17), further comprising a transmission unit that transmits information to be output to an output device by the determined output scheme.

19

An information processing method causing a processor to execute:
recognizing a situation in a space based on sensor data obtained by sensing the space in which a content is output; and
determining an output scheme of the content based on a result of the recognition and an analysis result of related information of the content.

20

A program configured to cause a computer to function as:
a recognition unit that recognizes a situation in a space based on sensor data obtained by sensing the space in which a content is output; and
a determination unit that determines an output scheme of the content based on a result of the recognition and an analysis result of related information of the content.

REFERENCE SIGNS LIST 1 information processing system
10 information processing apparatus
11 sensor
11a camera
11b distance sensor
11c illuminance sensor
11d microphone
12 output device
12a projector
12b display device
12c speaker
12d wearable device
100 control unit 100
101 recognition unit
102 content analysis unit
103 element processing unit
104 output scheme determination unit
105 output control unit
110 communication unit
120 input unit
130 storage unit

The invention claimed is:

1. An information processing apparatus comprising:
a recognition unit configured to recognize a situation in a space based on sensor data obtained by sensing the space in which a content is output;
a determination unit configured to determine an output scheme of the content based on a result of the recognition and an analysis result of related information of the content; and
a transmission unit configured to transmit information to be output to an output device by the determined output scheme,
wherein the determination unit is further configured to select one parameter of output, from a plurality of parameters of output of a plurality of output schemes, as a parameter of output having priority above all other parameters of output of the plurality of parameters of output, based on the analysis result of the related information of the content,
wherein the analysis result of the related information of the content includes a format of the content,
wherein the determination of the output scheme includes selecting the output scheme from the plurality of the output schemes based on the selection of the one parameter of output to have priority above all the other parameters of output,
wherein the determination unit is further configured to determine the output scheme by giving priority to a screen size based on the analysis result of the related information of the content when the content is a video, and
wherein the recognition unit, the determination unit, and the transmission unit are each implemented via at least one processor.

2. The information processing apparatus according to claim 1, wherein
the analysis result of the related information of the content further includes a target person who uses the content, a job on the content, or importance of the content.

3. The information processing apparatus according to claim 2, wherein
the recognition unit is further configured to perform a recognition process on a user existing in the space as the situation in the space.

4. The information processing apparatus according to claim 3, wherein
position coordinates, a field-of-view direction, and a state of the user are recognized as the recognition process on the user.

5. The information processing apparatus according to claim 2, wherein
the recognition unit is further configured to perform a recognition process on an environment around a user existing in the space as the situation in the space.

6. The information processing apparatus according to claim 5, wherein
at least one of detection of a planar area in the space, generation of an illuminance map, and sound field recognition is performed as the recognition process on the environment.

7. The information processing apparatus according to claim 2, wherein
the recognition unit is further configured to perform a recognition process on an output device existing in the space as the situation in the space.

8. The information processing apparatus according to claim 2, wherein
the determination unit is further configured to determine an output position, an output device, and an output parameter of the content as the output scheme.

9. The information processing apparatus according to claim 8, wherein
the output position is a position of a planar area in the space in a case of projection output from a projection display device.

10. The information processing apparatus according to claim 8, wherein
the output position is an installation position of the output device.

11. The information processing apparatus according to claim 8, wherein
when the output device is a wearable device, the output position corresponds to a position of a user wearing the wearable device.

12. The information processing apparatus according to claim 8, wherein
the determination unit is further configured to determine the output position based on a score for each output position calculated based on a score of each element calculated based on a recognition result of an environment and a user obtained by the recognition unit and weighted depending on the analysis result of the related information of the content.

13. The information processing apparatus according to claim 8, wherein
the determination unit is further configured to determine the output scheme by giving priority to closeness of a distance between an output position and a user when the content is a touch UI.

14. The information processing apparatus according to claim 8, wherein
the determination unit is further configured to determine the output scheme by giving priority to output resolution when the content is mainly a character.

15. The information processing apparatus according to claim 8, wherein
the determination unit is further configured to determine the output scheme by giving priority to a situation of a sound field at an output position when the content is a sound.

16. The information processing apparatus according to claim 8, wherein
the determination unit is further configured to determine the output scheme by giving priority to a line-of-sight direction of a user when the content is an image and the user is moving.

17. An information processing method causing a processor to execute:
recognizing a situation in a space based on sensor data obtained by sensing the space in which a content is output;
determining an output scheme of the content based on a result of the recognition and an analysis result of related information of the content;
transmitting information to be output to an output device by the determined output scheme;
selecting one parameter of output, from a plurality of parameters of output of a plurality of output schemes, as a parameter of output having priority above all other parameters of output of the plurality of parameters of output, based on the analysis result of the related information of the content,
wherein the analysis result of the related information of the content includes a format of the content, and
wherein the determination of the output scheme includes selecting the output scheme from the plurality of the output schemes based on the selection of the one parameter of output to have priority above all the other parameters of output; and
determining the output scheme by giving priority to a screen size based on the analysis result of the related information of the content when the content is a video.

18. A non-transitory computer-readable medium having embodied thereon a program, which when executed by a computer causes the computer to execute an information processing method, the method comprising:
recognizing a situation in a space based on sensor data obtained by sensing the space in which a content is output;
determining an output scheme of the content based on a result of the recognition and an analysis result of related information of the content;
transmitting information to be output to an output device by the determined output scheme;
selecting one parameter of output, from a plurality of parameters of output of a plurality of output schemes, as a parameter of output having priority above all other parameters of output of the plurality of parameters of output, based on the analysis result of the related information of the content,
wherein the analysis result of the related information of the content includes a format of the content, and
wherein the determination of the output scheme includes selecting the output scheme from the plurality of the output schemes based on the selection of the one parameter of output to have priority above all the other parameters of output; and
determining the output scheme by giving priority to a screen size based on the analysis result of the related information of the content when the content is a video.

19. The information processing apparatus according to claim 1, wherein the plurality of parameters of output of the plurality of output schemes includes at least one of a screen size, closeness of a distance between an output position and a user, output resolution, a situation of a sound field at an output position, or a line-of-sight direction of a user.

* * * * *